(12) United States Patent
Zeromski (10) Patent No.: US 7,373,895 B2
(45) Date of Patent: May 20, 2008

(54) INFLATABLE BOAT

(75) Inventor: Dominique Zeromski, Villenouvelle (FR)

(73) Assignee: Zodiac International (FR)

( * ) Notice: Subject to any disclaimer, the term of this patent is extended or adjusted under 35 U.S.C. 154(b) by 0 days.

(21) Appl. No.: 11/607,733

(22) Filed: Dec. 1, 2006

(65) Prior Publication Data

US 2007/0295260 A1    Dec. 27, 2007

(30) Foreign Application Priority Data

Jun. 23, 2006  (FR) .................................. 06 05658

(51) Int. Cl.
  *B63B 7/00*  (2006.01)
(52) U.S. Cl. ........................ 114/345; 441/41
(58) Field of Classification Search ................ 114/345; 441/40, 41, 42, 44, 90; 137/223, 231, 263, 137/597, 883
See application file for complete search history.

(56) References Cited

U.S. PATENT DOCUMENTS 3,550,652 A * 12/1970 Nimylowycz ................ 441/41
4,566,862 A * 1/1986 Halavais ....................... 441/41
4,633,763 A * 1/1987 Manning et al. ............ 137/883
4,919,067 A * 4/1990 Wenstob et al. ............ 114/345
5,860,379 A   1/1999 Moody

FOREIGN PATENT DOCUMENTS

| CH | 320648 | 5/1957 |
|----|--------|--------|
| GB | 743770 | 1/1956 |
| GB | 811045 | 3/1959 |

* cited by examiner

*Primary Examiner*—Lars A. Olson
(74) *Attorney, Agent, or Firm*—Dean W. Russell; Kilpatrick Stockton LLP

(57) ABSTRACT

An inflatable boat possessing at least two inflatable chambers (1) and a device (2) for distributing gas under pressure, the device comprising: a leaktight enclosure (3) possessing a first orifice (5) and at least two second orifices (6) connected to said chambers (1); at least two closure valves (7) associated respectively with the two second orifices (6) and normally urged into a position for closing the respective second orifices (6); and means (9) for simultaneously driving all of the closure valves (7) selectively in the opening direction or in the closing direction; this makes it possible to control simultaneous inflation or deflation of all the inflatable chambers (1).

11 Claims, 5 Drawing Sheets

INFLATABLE BOAT

CROSS REFERENCE TO RELATED APPLICATION

This application claims priority to French Patent Application No. FR 06 05658 filed on Jun. 23, 2006, the contents of which are incorporated by reference herein.

FIELD OF THE INVENTION

The present invention relates to the general field of inflatable boats, and more particularly it relates to improvements applied to inflating and/or deflating such boats when they include at least two inflatable chambers.

Although the invention relates to all types of inflatable chamber with which an inflatable boat might be equipped, it relates in more particularly advantageous manner to inflating and/or deflating the inflatable float(s) with which such boats are equipped. For reasons of safety, such inflatable floats are subdivided by internal partitions into a plurality of compartments in such a manner that if one compartment should become deflated by accident, the other compartments are not affected and the boat continues to be buoyant.

BACKGROUND OF THE INVENTION

It is known to fit the internal partitions with intercommunication means (intercommunication valves) suitable for being put into an open position so as to put two adjacent compartments into communication during inflation or deflation stages, thereby enabling all of the compartments to be inflated or deflated from a single inflation or deflation point situated on one of the compartments. Other than during inflation and deflation stages, the intercommunication valves must be put into the closed position so that as to ensure that the compartments are individually leaktight. In general, such intercommunication valves are fitted with manual control means enabling them to go from the closed position to the open position, and vice versa.

Such an arrangement presents the advantage of simplifying the work to be performed by the user during inflation or deflation operations, but it is accompanied by several major drawbacks.

One drawback of such an arrangement lies in the slowness of the inflation or deflation process when performed from a single point, since it is the entire volume of gas in the float that must pass through the single point. In addition, the distance between said single point (even when located in the center of the float) and the furthest points of a float remains large, particularly for boats of large dimensions; furthermore, the presence of a plurality of intercommunication valves through a plurality of partitions leads to head losses that slow down the propagation of gas. Thus, the float does not inflate or deflate in a manner that is substantially uniform overall, so the boat does not keep its trim during these operations.

Another drawback lies in the fact that the intercommunication valves are expensive devices. This equipment is therefore costly in an inflatable boat (which in practice can have as few as three or as many as seven or eight intercommunication valves depending on its dimensions and the number of compartments).

Yet another drawback lies in the fact that an intercommunication valve can be left in the open position (so that two adjacent compartments remain pneumatically interconnected) by inadvertence (closing forgotten, accidental opening), which can affect the buoyancy of the boat in the event of these compartments that have remained interconnected being deflated accidentally. This can become catastrophic if all of the intercommunication valves of a boat remain in the open position.

Yet another drawback lies in the fact that since the intercommunication valves are enclosed within the float, they are not accessible from the outside. If action needs to be taken on them (repair, replacement), it is necessary to open the float, and then after taking that action, to reclose the float in airtight manner, which constitutes an operation that is lengthy and difficult, and that can be performed only in a workshop.

It is as a result of those drawbacks that intercommunication valves have been abandoned progressively. All of the compartments are independent from one another and inflation and deflation is performed individually compartment by compartment, each compartment being fitted with its own inflation valve. The time required for inflation and/or deflation then remains long, however it is not that much longer than the time required for boats fitted with intercommunication valves. However since inflation valves are less expensive than intercommunication valves, the cost of manufacturing boats is reduced accordingly. The fact that the inflation valves can be situated on the float where they can be seen makes it easy to verify their open or closed position visually and the risk of a valve being left unexpectedly in an open position is eliminated. Finally, since the inflation valves are directly accessible on a float, maintenance operations (repair, replacement) are simplified and do not necessarily require action to be taken on the float proper.

Nevertheless, those arrangements with completely independent compartments still present drawbacks. A major drawback lies in the length of time required for inflation or deflation, and the multiplicity of handling operations needed for connecting the pump endpiece to all of the valves in succession. In addition, because of the need to inflate and/or deflate the compartments in succession, the boat does not maintain its trim while these operations are taking place.

SUMMARY OF THE INVENTION

Faced with this situation, the purpose of the invention is to propose an improved technical solution that combines the advantages of the prior art solutions, while simultaneously avoiding as far as possible all of their respective drawbacks, the solution proposed by the invention combining inflation and/or deflation operations that are fast with the trim of the boat being maintained throughout these operations, together with the economic and safety advantage inherent to having no intercommunication valves.

To these ends, the invention provides an inflatable boat with at least two pneumatic chambers, which is characterized in that it includes a device for distributing gas under pressure comprising:

an enclosure closed in leaktight manner, said enclosure possessing at least one first orifice and at least two second orifices connected respectively to said chambers;

at least two closure valves associated respectively with the at least two second orifices, said valves being normally urged into a position for closing the respective second orifices; and drive means suitable for causing all of the closure valves to be driven simultaneously, selectively in the opening direction or in the closing direction.

In the context of the present invention, the term "gas distributor device" is used to designate a device that operates in both directions and that is capable in one direction of distributing a stream of gas arriving via an inlet between a plurality of outlets, and conversely of combining a plurality of gas streams arriving through said outlets (then acting as inlets) in a single stream passing through the sole inlet (then acting as a sole outlet).

By means of this arrangement in accordance with the invention, it is possible to control simultaneous inflation or deflation of the at least two pneumatic chambers, thus making the operations of inflation and deflation less lengthy and not requiring multiple interventions by an operator.

In a preferred embodiment, the boat comprises pump means associated with an air compressor for compressing air to a pressure greater than atmospheric pressure. In which event the pump means are advantageously connected to the first orifice and are of the reversible type, such that, when the valves are driven into the open position, said means are suitable for operating selectively in a first direction for generating air under pressure greater than atmospheric pressure and blown into the enclosure through said first orifice for inflation purposes, and in an opposite, second direction for extracting air under pressure from said inflatable chambers through the enclosure and the first orifice for deflation purposes, with the air being rejected to the atmosphere, for example. In a variant, provision could also be made for the boat to include a pneumatic selector possessing firstly at least one first orifice connected to the first orifice of the enclosure, and secondly both a second orifice connected to the pump means and a third orifice connected to the outside, said selector being suitable for connecting its above-mentioned first orifice selectively either with its above-mentioned second orifice, for inflation purposes, or with its above-mentioned third orifice, for deflation purposes.

In a preferred embodiment of the distributor device, provision is made for:

all of the second orifices to be situated in a common wall of the enclosure;

all of the valves to possess valve stems that are substantially parallel to one another with the free ends of the stems being substantially coplanar; and the valve drive means to comprise:

a plate for driving the valve stems and disposed inside said enclosure substantially parallel to the plane of the ends of the stems; and drive means secured to said plate to move it substantially parallel to the direction in which the valve stems extend between two functional positions, namely a raised position in which the valve stems are raised under drive from resilient means so that the valves are in the closed position, closing the respective second orifices, and a lowered position in which the plate pushes back simultaneously against all of the valve stems against the resilient means so that the valves are in a position opening the respective second orifices.

In an embodiment of simple structure, the plate drive means comprise:

a hollow shaft that is engaged through a wall of said enclosure opposite from the wall of the enclosure that includes the second orifices, and that is supported thereby so as to be free to turn;

a hub secured to the plate and extending substantially perpendicularly to said plate, through said hollow shaft; complementary helical portions in relief provided on the respective co-operating faces of said hollow shaft and of said hub, whereby turning movement of the hollow shaft in one direction or in the opposite direction is converted into axial linear movement of said plate in one direction or in the opposite direction; and displacement means secured to said shaft to enable it to be turned in one direction or the other direction.

In addition, to make the distributor device compact, provision can be made for:

the hub to be tubular in shape;

the above-mentioned first orifice of the enclosure to be the orifice of said tubular hub that is located inside the enclosure; and a sealing diaphragm to extend between the side wall of the enclosure and the plate in such a manner that said drive means are situated on one side of the diaphragm, and the first and second orifices of the enclosure are situated on the other side of the diaphragm.

In an embodiment that is simple and therefore of low cost, the means for displacing the hollow shaft are of the manual type and comprise a radial handle secured to the hollow shaft. Nevertheless, it will be understood that more sophisticated technical solutions could make use of further improved means, such as remote controls, distributor device control means that are coupled with a control for setting the pump into operation in the appropriate direction (inflation or deflation), etc.

It will also be understood that the provisions of the invention as explained above can be added to in various ways depending on the requirements encountered in specific applications or with specific items of equipment, in particular in product ranges, e.g. by providing means for monitoring inflation pressure (pressure gauge), which can be overall means applying to the pump means and/or to the distributor device, and/or which can be individual means specific to each chamber.

As can be seen clearly from the explanations given above, a particularly preferred (although not exclusive) application for the provisions in accordance with the invention lies in equipment for an inflatable boat of the above-specified type comprising at least one inflatable float subdivided into a plurality of compartments by transverse partitions, the boat then being characterized in that the compartments constitute the above-mentioned chambers, in that the partitions are airtight and without intercommunication between one another, and in that connection tubes in number equal to the number of compartments and to the number of second orifices of the gas distributor device connect the compartments respectively to said second orifices of the gas distributor device, whereby all of the compartments of the float can be inflated and/or deflated simultaneously and therefore quickly, with the additional advantage of the boat maintaining its trim while these operations are taking place.

In a most advantageous embodiment, the gas distributor device may be housed in the inflatable float, for example being housed in a unit arranged for mounting inside the float as explained in document FR 2 847 879 in the name of the Applicant, and the tubes extend inside the float, leaktight feedthroughs being provided respectively therefor in the partitions.

Nevertheless, it is possible to arrange for the gas distributor device to be located in the boat outside the inflatable float, for example being sheltered in a navigation console when one is provided, or in a bow chest integrated in a rigid deck; it is then advantageous for the tubes to extend under a floor of the boat so as to be invisible and out of the way of the occupants of the boat.

Although all sorts of pump means can be implemented in the context of the invention, a solution that is technically simple and nowadays inexpensive, in particular for equipping top-of-range boats, consists in using an on-board electric pump connected to the on-board electricity circuit.

The provisions in accordance with the invention make it possible in general to simplify and accelerate the operations of inflating and/or deflating inflatable boats of any type. However these provisions can also provide advantages in particular applications, some of which are being encountered with increasing frequency. Thus, these provisions can be advantageous with semi rigid boats that are housed in shelters on board large boats or yachts, since they can thus be housed with their floats in a deflated state: it then becomes possible to house a semi rigid boat of larger dimensions in a given shelter or to provide a shelter that is smaller for receiving a semi rigid boat of given dimensions. Another advantageous field of application lies in transporting semi rigid boats of great width which, by deflating their inflatable floats, can be loaded onto a road trailer and comply with highway loading gauges or on a railway car and comply with rail loading gauges.

As an additional advantage of great importance, it is emphasized that the device in accordance with the invention is very easy to maintain, to repair, and to replace, either in full or in part, in particular when the device is located outside the float.

Furthermore, by its very design, the device in accordance with the invention can be implemented without difficulty in preexisting boats that were not provided with the device initially.

Finally, it may be observed that all of the chamber inflation circuits are in parallel and can therefore easily be isolated from one another, e.g. in the event of one of the chambers being damaged, so as to maintain the other chambers in an inflated condition, or indeed in order to adjust inflation of the various chambers individually.

BRIEF DESCRIPTION OF THE DRAWINGS

The invention can be better understood on reading the following detailed description of preferred embodiments given purely as non-limiting examples. In the description, reference is made to the accompanying drawings, in which.

DETAILED DESCRIPTION OF THE INVENTION

Figure 1A:
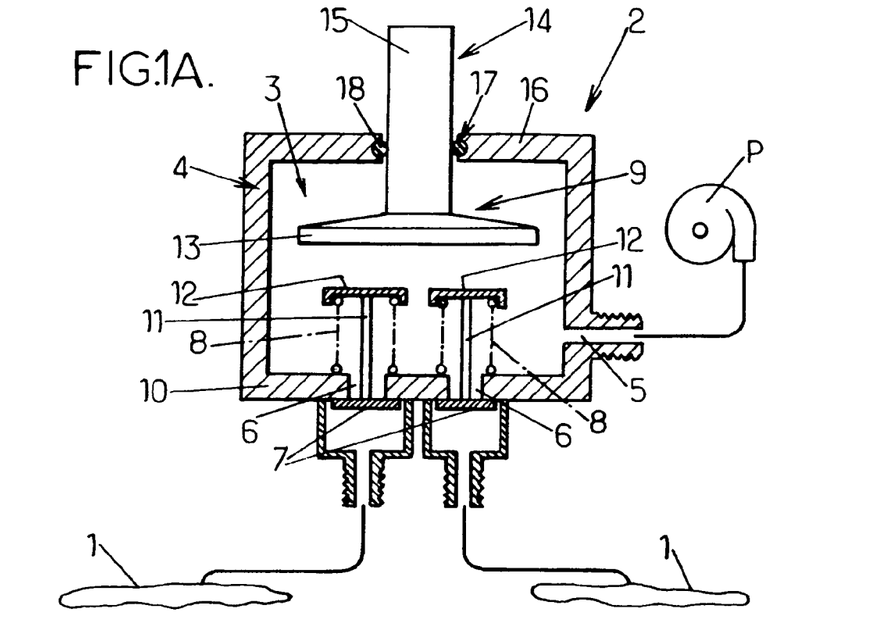
FIGS. 1A, 1B, and 1C are highly diagrammatic views of an inflatable boat arranged in accordance with the invention, showing only those parts needed for understanding the invention, and showing them respectively in three different functional positions.

Reference is made initially to FIG. 1A which is a diagram showing one arrangement for an inflatable boat in accordance with the invention. In this diagram, only those elements that are needed for understanding the invention are shown, while the boat itself is not shown explicitly since its overall design is not involved in any essential manner in the fundamental design of the invention.

In the invention, the inflatable boat has at least two inflatable chambers 1 that need to be inflated with gas at the same pressure (typically compressed air); in FIG. 1A, the boat is represented merely by two chambers 1.

The boat also includes a device 2 for distributing gas under pressure, which device comprises an enclosure 3 that is closed in airtight manner and defined by a case or box 4 designed in any suitable manner in association with its function and its installation in the boat; this case can be made in particular out of molded synthetic material, and an example is illustrated below.

Figure 1B:
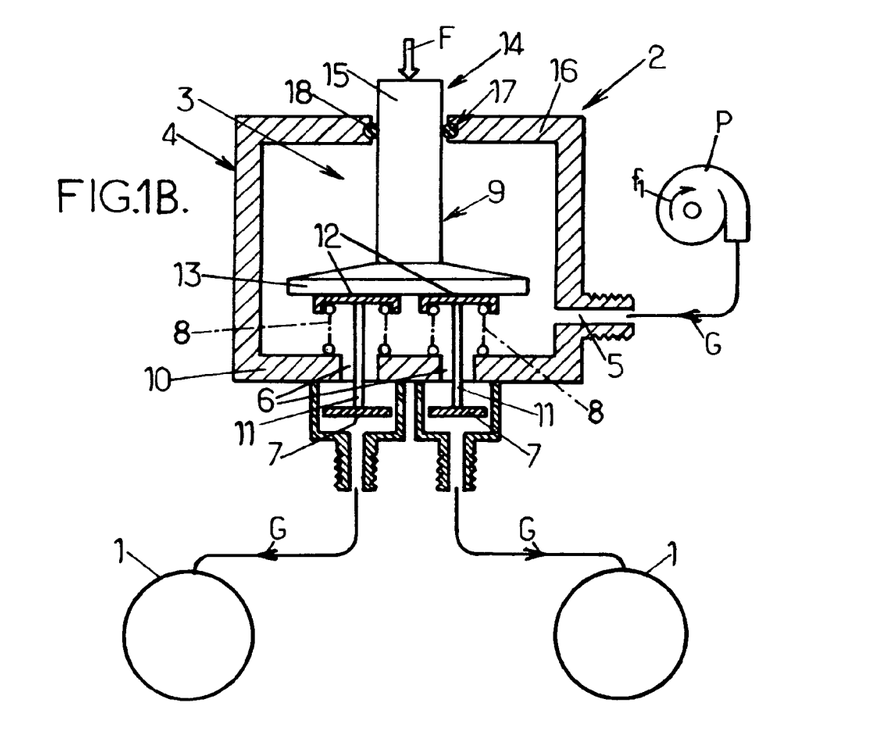
Figure 1C:
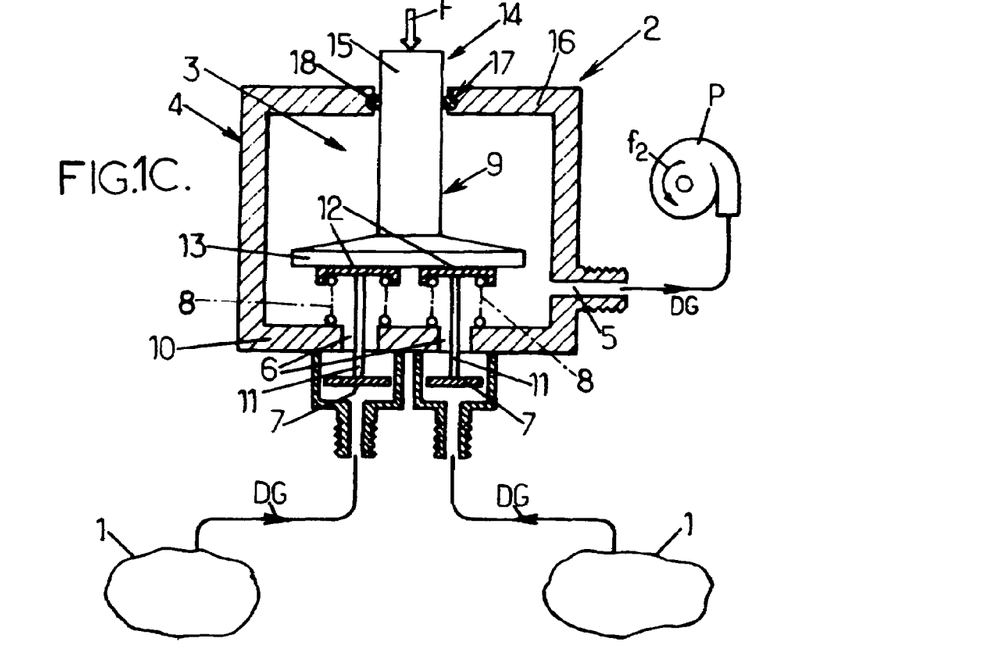

The enclosure 3 possesses at least one first orifice 5 (where the number of these first orifices is determined as a function of the gas flow rate to be delivered), a single first orifice 5 being shown in the arrangement of FIG. 1; the first orifice 5 is connected to pump means P. The enclosure 3 also possesses at least two second orifices 6 that are present in number equal to the number of chambers 1 and that are connected respectively to the chambers 1.

The enclosure 3 is also fitted with at least two closure valves 7 in number equal to the number of second orifices 6 and associated respectively with the second orifices 6; springs 8 are structurally associated with the respective closure valves so as to urge them into a position where they close the second orifices 6, in the absence of any opposing force.

Finally, drive means 9 are provided for simultaneously actuating all of the closure valves 7 selectively in the opening or closing direction.

In a practical embodiment as shown in FIG. 1A, all of the second orifices are grouped together side by side in a single wall 10 of the case 4 (in practice this wall 10 is the bottom of the case). The closure valves 7 are mechanically secured to stems 11 that extend inside the enclosure 3 substantially parallel to one another. The ends of the stems 11 are all situated in substantially the same plane that is substantially parallel to the wall 10. In a simple embodiment, the ends of the stems 11 are secured to respective cups 12 against which the return springs 8 bear. Thus, the cups 12 are all disposed side by side and substantially in a single plane inside the enclosure 3.

In this context, the drive means 9 can be designed in a manner that is structurally simple in the form of a drive plate 13 situated inside the enclosure 3 and extending substantially parallel to the plane in which the cups 12 are situated. The plate 13 is secured to drive means 14 arranged to communicate displacement to the plate in a direction that is substantially perpendicular to its plane, i.e. substantially parallel to the direction in which the stems 18 extend. In the diagrammatic view of FIG. 1A, the drive means 14 are represented in the form of a shaft or hub 15 that passes through the wall 16 of the case 4 opposite from the above-mentioned wall 10, and that extends outside the case 4 forming something that can be considered as a handle for manual actuation. Sealing means 17 are provided to isolate the enclosure 3 in airtight manner; in the diagram of FIG. 1A, a sealing gasket 18 is interposed between the shaft 15 and the wall 16 of the case 4.

In the rest position shown in FIG. 1A, the drive means 9 are in a rest situation and the drive plate 13 does not act on the closure valve 7 (this is represented by the plate 7 being spaced apart from the cups 12). The second orifices 6 are then closed by the valves 7 under the return force from the springs 8. The pump means P are not in operation, or if they are in operation, no fluid flow can be established because the second orifices 6 are closed.

In order to inflate the chambers 1 (FIG. 1B), the pump means P are put into operation in a mode for compressing inflation fluid (in practice compressed air), represented by rotary arrow $f_1$, and the shaft 14 is pushed in (arrow F), so that the drive plate 13 acts on the cups 12 and pushes back the closure valves 7 against the return forces of the springs 8 (abutment means (not shown) limit the stroke of the drive means 9 when holding the valves 7 in the open position). The compressed air delivered by the pump means P then flows (arrows G) to the chambers 1 via the second orifices 6. All of the chambers 1 are fed simultaneously and they are inflated simultaneously, to the same pressure. Once inflation has been completed, the shaft 15 is raised so that the closure valves 7 are returned to the position for closing the second orifices 6, thereby isolating the chambers 1.

In order to deflate the chambers 1 (FIG. 1C), the process is the same as for inflation as described above, with the exception that the pump means P are put into operation in a mode for sucking out the fluid present in the chambers 1, represented by an opposite rotary arrow $f_2$. The air sucked in by the pump means then flows (arrows DG) from the chambers 1 via the second orifices 6 to the pump means P, from which it is rejected to the outside (in practice, into the atmosphere).

In a variant (not shown), a pneumatic selector could also be provided possessing firstly a first orifice connected to the first orifice 5 of the enclosure 3, and secondly a second orifice connected to the pump means P together with a third orifice connected to the outside; the selector is suitable for connecting its above-mentioned first orifice selectively either with its above-mentioned second orifice (for inflation) or to its above-mentioned third orifice (for deflation).

Figure 2:
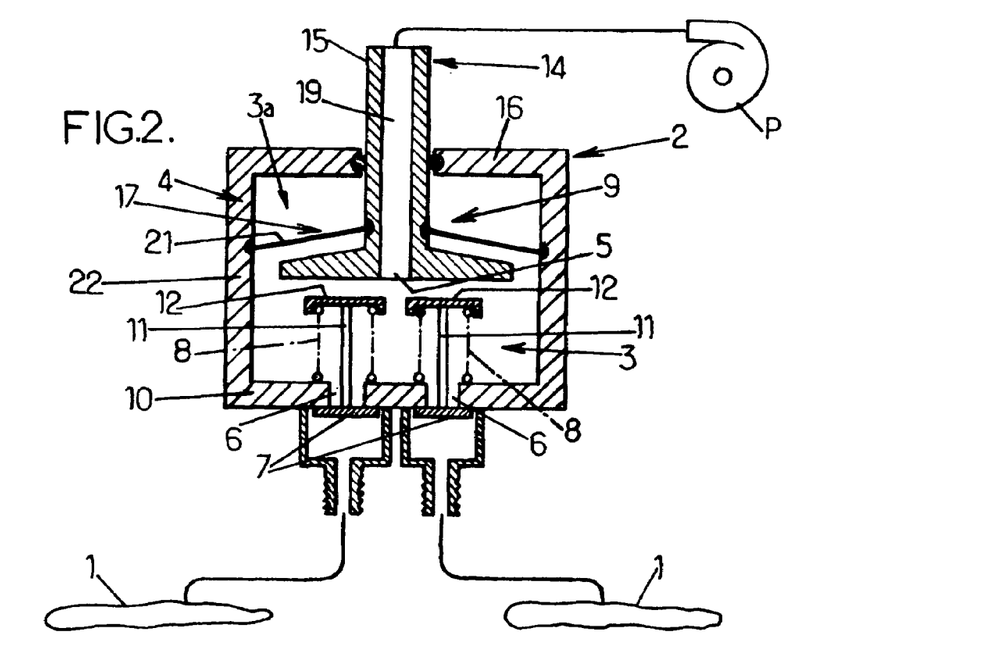
FIG. 2 is a highly diagrammatic view of a preferred embodiment of the arrangement in accordance with the invention shown in the functional position of FIG. 1A.

FIG. 2 shows, still highly diagrammatically, a preferred variant embodiment which conserves the provisions described above with reference to FIG. 1A, with the exception of two points.

Firstly, in order to simplify the overall structure, the first orifice 5 is structurally combined with the drive means 9. For this purpose, the shaft 15 is hollowed out axially by a channel 19 and is thus in the form of a tube, the first orifice 5 being situated at the end of the channel 19 that is inside the enclosure 3.

The case 4 then includes only the second orifices 6 that are grouped together in its wall 10 (bottom wall) and that can thus receive the closure valves 7 and the springs 8 (in practice these are constituted by preassembled units in the form of cartridges for inserting in a housing).

Naturally, it may be observed at this point, that in terms of simplifying the arrangement of the case 4, a similar result could be obtained by placing the first orifice 5 in the wall 10, e.g. in an axial position with the second orifices distributed around it.

Another improvement concerns the arrangement of the sealing means 17. It is relatively difficult to establish an airtight seal with the sliding shaft 15 and that will operate reliably over time in the presence of a marine atmosphere. It is therefore more advantageous from a reliability point of view to provide an elastically deformable membrane or diaphragm 21 inside the enclosure, which is secured in leaktight manner via its perimeter to the inside face of the side wall 22 of the case 4, and which is clamped in leaktight manner onto the drive means 9; in order to ensure that the diaphragm 21 possesses sufficient capacity for deformation, it is preferable for it to be clamped onto the shaft 15 above the plate 13 so as to present a radial extent that is large. Under such conditions, the airtight enclosure 3 is restricted to the inside portion of the case that underlies the diaphragm 21, while the inside portion 3a of the case that is above the diaphragm 21 and that houses purely mechanical components is not airtight.

Figure 3A:
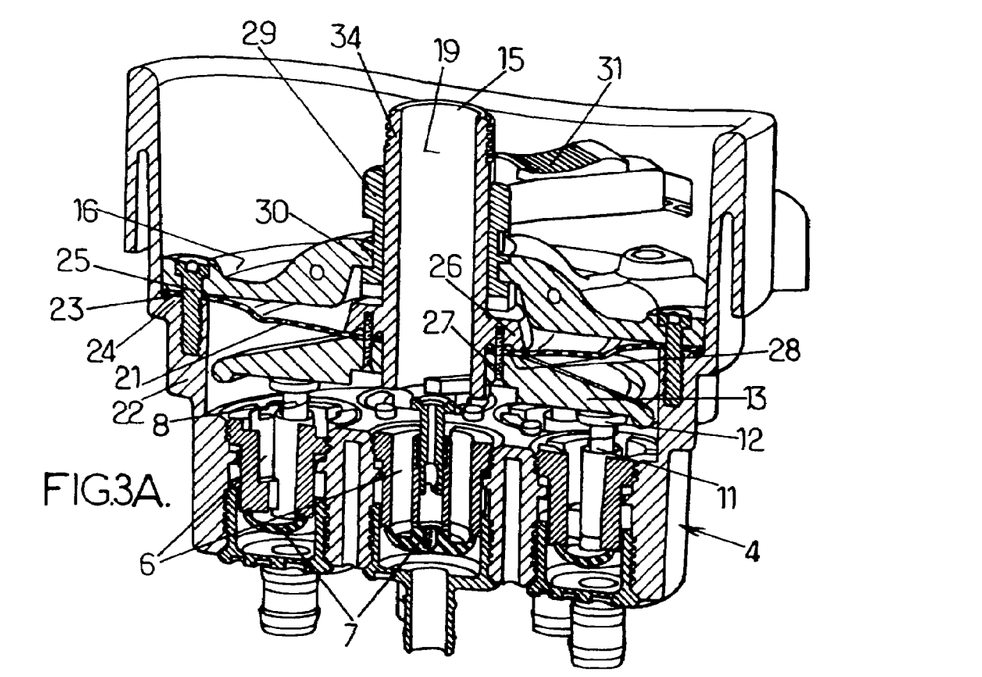
FIG. 3A is a diametral section view of a practical and preferred embodiment of a gas distributor device implemented in the arrangement of FIG. 2.

FIG. 3A is a diametral section through a specific and preferred embodiment of the device described above with reference to FIG. 2, and FIG. 3B is an outside perspective view of the same device, with the case 4 and the wall 10 being omitted to make the figure easier to read. In these two figures, the same numerical references are retained for designating these members or portions that are analogous to corresponding members or portions in FIGS. 1A to 1C and 2. By way of example, and for a utilization that is explained below, the device 2 is fitted with seven orifices 6 (one in a central position and six distributed around it).

Figure 3B:
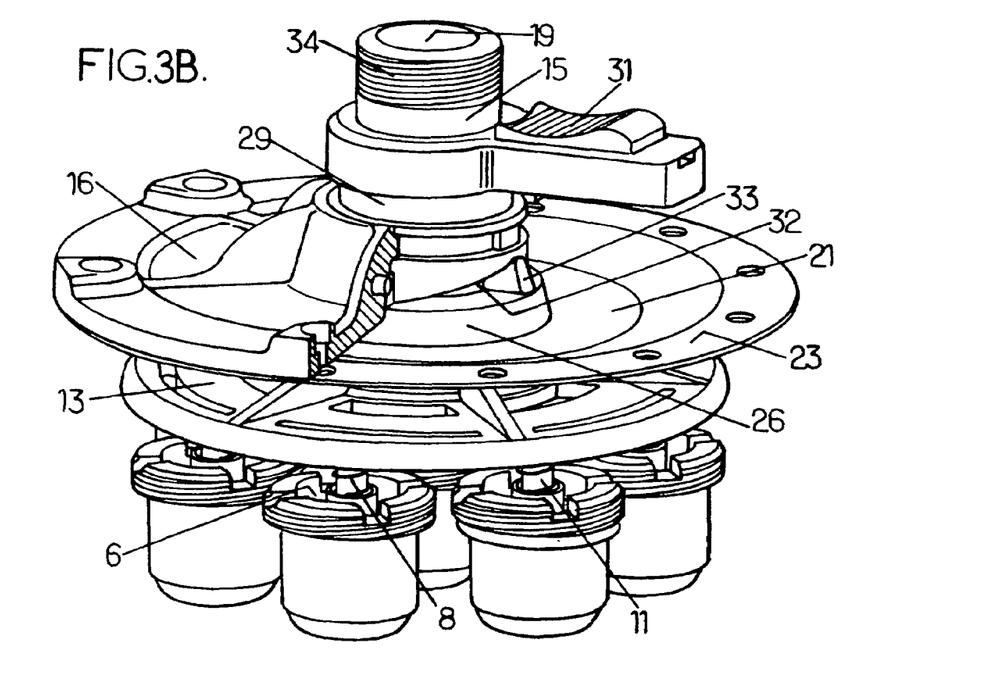
FIG. 3B is a perspective view of the FIG. 3A gas distributor device with its case removed.

Compared with the explanations given above with reference to FIG. 2, the preferred embodiment shown in FIGS. 3A and 3B presents two structural features that are specific to simplifying manufacture and assembly, and also to simplifying maintenance.

Firstly, it can be seen that the peripheral edge 23 of the diaphragm 21 is pinched in airtight manner between firstly the top wall 16 of the case 4, which is made in the form of a separate part, and secondly a shoulder 24 provided on the inside face of the side wall 22 of the case, with clamping being provided by screws 25 distributed around the perimeter.

The shaft 15 and the plate 13, which are shown as a one-piece unit in FIGS. 1A to 1C, and 2, are shown here as being implemented in the form of two distinct parts. The bottom end of the shaft 15 has an annular collar 26 projecting radially outwards with the plate 13 bearing thereagainst, assembly being performed by means of screws 27 distributed around its perimeter. The inside edge 28 of the diaphragm 21 is pinched in airtight manner between said collar 26 and the plate 13.

Thereafter, it should be observed that the shaft 15 is moved axially by implementing drive means suitable for transforming rotary movement. Although it is possible to envisage mechanization of this control, in particular in order to make remote control possible, it is nevertheless simpler and less expensive to provide manual control, using a rotary handle. For this purpose, the shaft 15 is surrounded by a hollow shaft or ring 29 which is prevented from moving axially in a hole 30 in the wall 15, but which is free to turn relative to the wall 16 (e.g. by a set of two ribs situated on either side of the edge of the hole 30, as shown in FIG. 3A). A radially-extending handle 31 is secured to the ring 29. Finally, complementary portions in relief on the ring 29 and on the shaft 15 are suitable for causing the shaft 15 to move axially when the ring 29 is caused to turn by means of the handle 31; in simple manner, these complementary portions in relief may comprise at least one inclined ramp 32 carried by the ring 29, and at least one respective stud 33 projecting radially from the shaft 15 and engaged in said groove. These complementary portions in relief can be seen more clearly in FIG. 3B.

The top end 34 of the shaft 15 may advantageously be arranged (in particular threaded) so as to receive a removable plug 35 (visible in FIG. 4), if the connection to the pump means P is not established on a permanent basis.

Although the provisions in accordance with the invention as described above can serve to inflate and deflate any chamber present in the boat, regardless of the function of that chamber, it will be understood that the invention applies particularly to compartments that are defined by internal partitions in at least one of the floats of the boat that are inflated and deflated. In the context to which the invention applies, these partitions do not have any intercommunication valves, so the partitions are airtight and each compartment is self-contained from a pneumatic point of view and must be inflated individually. It is then said float compartments that constitute the above-mentioned chambers 1. Connection tubes 36 in number equal to the number of compartments 1 and the number of second orifices 6 in the gas distributor device connect the compartments 1 respectively to said second orifices 6 of the gas distributor device. This procures the advantage of simultaneous inflation and/or deflation of all of the compartments 1, thereby accelerating operations if the pump means P possess pumping capacity appropriate to the volumes of gas to be moved.

Practical implementation of the provisions in accordance with the invention can give rise to numerous embodiments, in particular depending on the dimensions of the boat and thus the number of compartments, and depending on the extent to which the boat is fitted out.

There are several locations where the gas distributor device can be located on board a boat.

Figure 5A:
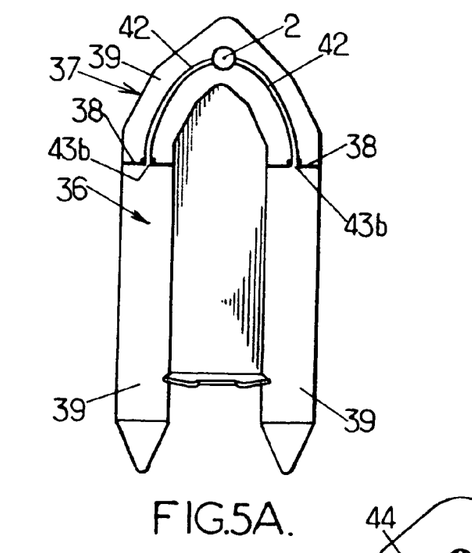
FIGS. 5A and 5B are diagrams respectively showing two examples of inflatable boat equipment including the FIG. 4 device installed in the inflatable float.
Figure 5B:
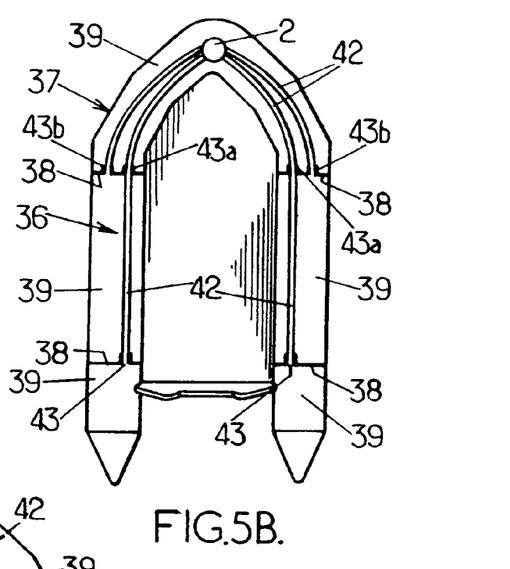

In the diagrammatic examples of FIGS. 5A and 5B, the distributor device 2 is located inside the inflatable float 36 of the boat 37 (the only float in these examples), which float 36 is subdivided by airtight partitions 38 into a plurality of compartments 39.

Figure 4:
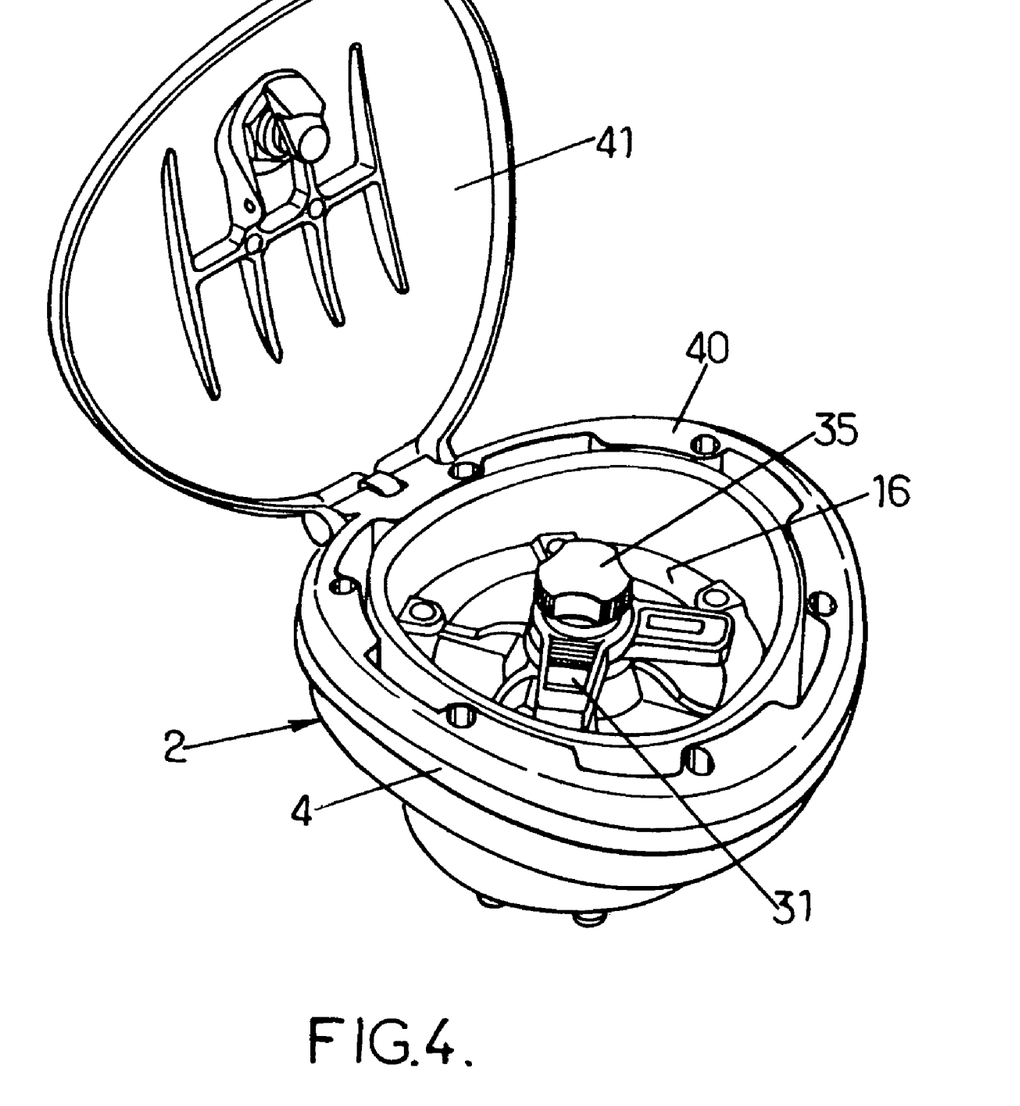
FIG. 4 is a perspective view of the gas distributor device of FIGS. 3A and 3B shown fitted with a case suitable for mounting in the inflatable float of an inflatable boat.

The design of the device 2 is then adapted to this type of installation, e.g. in the manner shown in FIG. 4. The top of the case 4 is provided with a removable frame 40 suitable for pinching the flexible fabric of the float 36 around the perimeter of a hole made therein, using the dispositions set out in patent document FR 2 847 879 in the name of the Applicant. The device 2 is thus integrated in the float and does not require space to be allocated thereon in the boat. A lid 41 for closing the case 4 can be provided for protection purposes and also to provide continuity of shape for the float; for this purpose, the edge of the case and the lid can be shaped to match the rounded shape of the float, which as well as improving appearance also provides a better distribution of the forces acting on the fabric around the case.

Figure 6A:
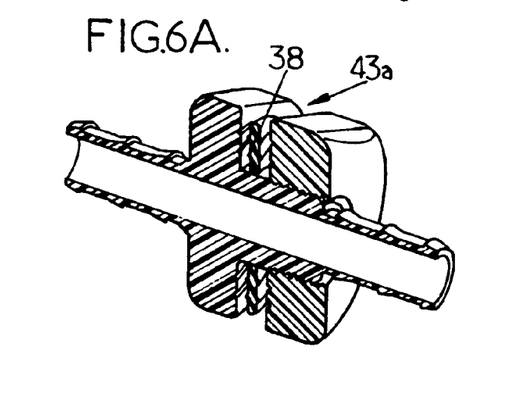
FIGS. 6A and 6B are two section views respectively showing two examples of leaktight feedthroughs suitable for fitting to the boats of FIGS. 5A and 5B.
Figure 6B:
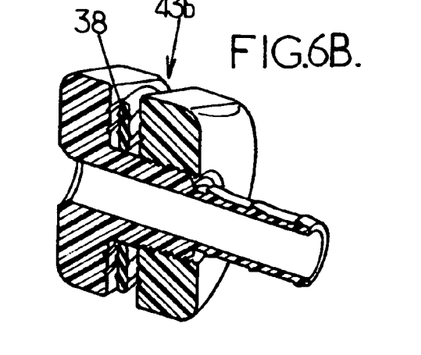

Returning to FIG. 5A (three-compartment boat), and FIG. 5B (five-compartment boat), the device 2 is disposed in an approximately axial position so as to reduce as much as possible the length of the tubes 42 connecting it to the compartments 39; the device can thus be situated in the bow compartment. The tubes 42 extend inside the inflatable float. The partitions 38 are provided with airtight feedthroughs 43 with the fabric of the partition being pinched therein as shown in FIG. 6A for the feedthrough 43a arranged to connect together two tubes situated on either side, or as shown in FIG. 6B for the feedthrough 43b that opens out into a compartment and that is arranged to be connected to a tube on one side only.

Figure 7:
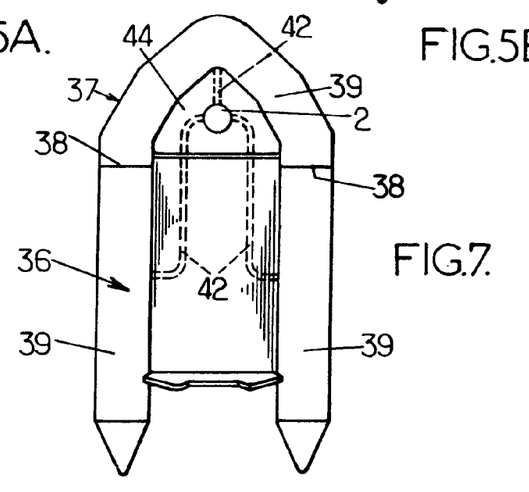
FIG. 7 is a diagram showing another example of equipment on board an inflatable boat in accordance with the invention using the device of FIGS. 3A and 3B.

Naturally, the device 2 can also be disposed outside the float, preferably being sheltered so as to be protected from impacts and avoid creating clutter within the boat. For this purpose, the device 2 may be located in a console if the boat has one, or else in a deck chest, e.g. in a bow chest 44 as shown in FIG. 7. Under such circumstances, it is desirable for the tubes 42 not to remain outside, in particular to avoid them being damaged; provision can then be made for them to be located under a floor, e.g. under an inflatable floor if the boat has one.

The pump means P may be external to the boat. However they may also be on-board pump means, in which event it is preferable for them to comprise an electric pump connected to the on board electricity circuit. If it is not possible to associate such a pump physically with the device 2, it can be connected to the first orifice 5 of the device 2 by a tube under the same conditions as mentioned above for the tubes 42.

What is claimed is:

1. An inflatable boat with at least two inflatable chambers, including a pressurized gas distributor device comprising:
   an enclosure closed in leaktight manner, said enclosure possessing at least one first orifice and at least two second orifices connected respectively to said chambers;
   at least two closure valves associated respectively with the at least two second orifices, said valves being normally urged into a position for closing the respective second orifices; and
   drive means suitable for causing all of the closure valves to be driven simultaneously, selectively in the opening direction or in the closing direction; whereby it is possible to cause all of the inflatable chambers to be inflated or deflated simultaneously,
wherein the second orifices are situated in a common wall of the enclosure, wherein all of the valves possess respective valve stems extending substantially parallel to one another with the free ends of the stems being substantially coplanar, and
wherein the valve drive means comprise:
   a plate for driving the valve stems and disposed inside said enclosure substantially parallel to the plane of the ends of the stems; and
   drive means secured to said plate to move it substantially parallel to the direction in which the valve stems extend between two functional positions, namely a raised position in which the valve stems are raised under drive from resilient means so that the valves are in the closed position, closing the respective second orifices, and a lowered position in which the plate pushes back simultaneously against all of the valve stems against the resilient means so that the valves are in a position opening the respective second orifices.

2. An inflatable boat according to claim 1, including pump means associated with an air compressor for compressing air to a pressure greater than atmospheric pressure.

3. An inflatable boat according to claim 2, wherein the pump means are connected to the first orifice and are of the reversible type, such that, when the valves are driven into the open position, said means are suitable for operating selectively in a first direction for generating air under pressure greater than atmospheric pressure and blown into the enclosure through said first orifice for inflation purposes, and in an opposite, second direction for extracting air under pressure from said inflatable chambers through the enclosure and the first orifice for deflation purposes.

4. An inflatable boat according to claim 2, including a pneumatic selector having firstly at least one first orifice connected to the first orifice of the enclosure and secondly both a second orifice connected to the pump means and a third orifice connected to the outside, said selector being suitable for connecting its above-mentioned first orifice selectively either with its above-mentioned second orifice, for inflation purposes, or with its above-mentioned third orifice, for deflation purposes.

5. An inflatable boat according to claim 1, wherein the drive means of the plate comprise:
- a hollow shaft that is engaged through a wall of said enclosure opposite from the wall of the enclosure that includes the second orifices, and that is supported thereby so as to be free to turn;
- a hub secured to the plate and extending substantially perpendicularly to said plate, through said hollow shaft;
- complementary helical portions in relief provided on the respective co-operating faces of said hollow shaft and of said hub, whereby turning movement of the hollow shaft in one direction or in the opposite direction is converted into axial linear movement of said plate in one direction or in the opposite direction; and
- displacement means secured to said shaft to enable it to be turned in one direction or the other direction.

6. An inflatable boat according to claim 5,
wherein the hub is tubular in shape;
wherein said above-mentioned first orifice of the enclosure is the orifice of said tubular hub that is located inside the enclosure; and
wherein a sealing diaphragm extends between the side wall of the enclosure and the plate in such a manner that said drive means are situated on one side of the diaphragm, and the first and second orifices of the enclosure are situated on the other side of the diaphragm.

7. An inflatable boat according to claim 1, wherein the means for displacing the hollow shaft are of the manual type and comprise a radial handle secured to the hollow shaft.

8. An inflatable boat according to claim 1, comprising at least one inflatable float subdivided into a plurality of compartments by transverse partitions, wherein the compartments constitute the above-mentioned chambers, wherein the partitions are airtight and without intercommunication between one another, and wherein connection tubes in number equal to the number of compartments and to the number of second orifices of the gas distributor device connect the compartments respectively to said second orifices of the gas distributor device.

9. An inflatable boat according to claim 8, wherein the gas distributor device is housed in the inflatable float, and wherein the tubes extend inside the float, leaktight feedthroughs being provided respectively therefor in the partitions.

10. An inflatable boat according to claim 8, including a floor, wherein the gas distributor device is disposed in the boat outside the inflatable float, and wherein the tubes extend under the floor.

11. An inflatable boat according to claim 1, wherein the pump means comprise an electric pump.

* * * * *